(12) United States Patent
Bai et al.

(10) Patent No.: US 11,641,649 B2
(45) Date of Patent: May 2, 2023

(54) TRANSMISSION OF A BEAM FAILURE RECOVERY REQUEST VIA A SECONDARY CELL USED FOR CARRIER AGGREGATION

(71) Applicant: QUALCOMM Incorporated, San Diego, CA (US)

(72) Inventors: Tianyang Bai, Somerville, NJ (US); Jung Ho Ryu, Fort Lee, NJ (US); Yan Zhou, San Diego, CA (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/014,305

(22) Filed: Sep. 8, 2020

(65) Prior Publication Data

US 2021/0092733 A1 Mar. 25, 2021

Related U.S. Application Data

(60) Provisional application No. 62/902,759, filed on Sep. 19, 2019.

(51) Int. Cl.
*H04W 4/00* (2018.01)
*H04W 72/04* (2023.01)
*H04W 24/04* (2009.01)

(52) U.S. Cl.
CPC ....... *H04W 72/0413* (2013.01); *H04W 24/04* (2013.01)

(58) Field of Classification Search
CPC .... H04W 24/04; H04W 7/0695; H04W 7/088
See application file for complete search history.

(56) References Cited

U.S. PATENT DOCUMENTS

2019/0274098 A1\* 9/2019 Cheng ................... H04W 76/19
2020/0374960 A1\* 11/2020 Deenoo ............. H04W 72/1284
(Continued)

OTHER PUBLICATIONS

Convida Wireless: "On Beam Failure Recovery for Scell", 3GPP Draft, 3GPP TSG-RAN WG1 Meeting #95, R1-1813624, On Beam Failure Recovery for Scell, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555682, 4 pages, Retrieved from the Internet: URL: http://www.3gpp.org/ftp/Meetings%5F3GPP%5FSYNC/RAN1/Docs/R1%2D1813624%2Ezip. [retrieved on Nov. 11, 2018] the whole document.
(Continued)

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may detect beam failure on a secondary cell (SCell), wherein the UE is configured with a primary cell (PCell) and the SCell for carrier aggregation with a base station; identify one or more resources for transmission of a beam failure recovery request based at least in part on detecting the beam failure, wherein the one or more resources are on one or more SCells configured for the UE; and transmit the beam failure recovery request to the base station using the one or more resources. Numerous other aspects are provided.

29 Claims, 7 Drawing Sheets

(56) References Cited

U.S. PATENT DOCUMENTS

2021/0314051 A1* 10/2021 Yang ................. H04W 74/0841
2021/0315041 A1* 10/2021 Matsumura ........... H04W 76/19
2022/0006690 A1* 1/2022 Matsumura ......... H04L 41/0672

OTHER PUBLICATIONS

International Search Report and Written Opinion—PCT/US2020/070512—ISA/EPO—dated Nov. 17, 2020.
Qualcomm Incorporated: "Enhancements on Multi-Beam Operation", 3GPP Draft, 3GPP TSG-RAN WG1 Meeting #96-Bis, R1-1905027, Enhancements on Multi-Beam Operation, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700136, 26 pages, Retrieved from the Internet: URL: http://www.3gpp.org/ftp/Meetings%5F3GPP%5FSYNC/RAN1/Docs/R1%201905027%2Ezip, [retrieved on Apr. 7, 2019] paragraph [0002],Section 1; p. 1, Section 2.5; p. 9.

* cited by examiner

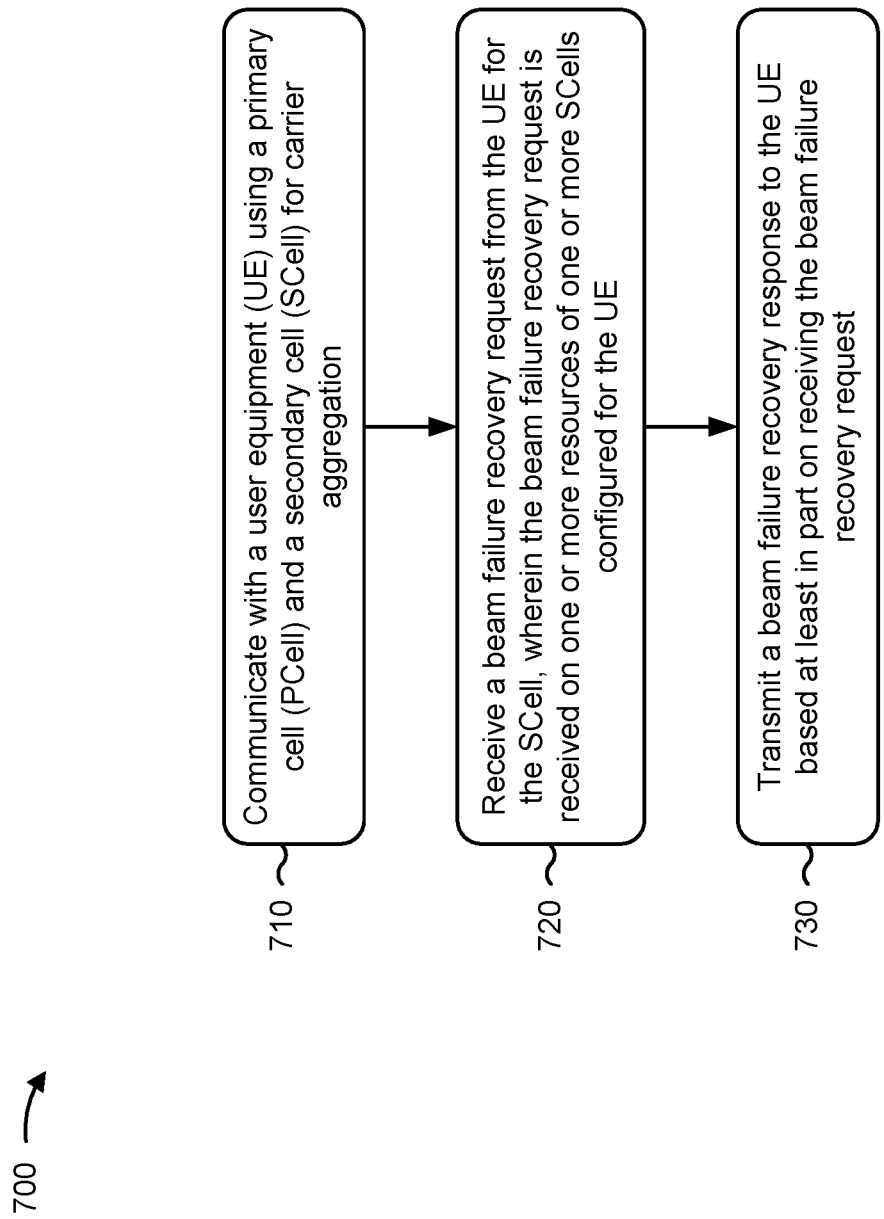

TRANSMISSION OF A BEAM FAILURE RECOVERY REQUEST VIA A SECONDARY CELL USED FOR CARRIER AGGREGATION

CROSS-REFERENCE TO RELATED APPLICATION

This Patent Application claims priority to U.S. Patent Application No. 62/902,759, filed on Sep. 19, 2019, entitled "TRANSMISSION OF A BEAM FAILURE RECOVERY REQUEST VIA A SECONDARY CELL USED FOR CARRIER AGGREGATION," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for transmission of a beam failure recovery request via a secondary cell used for carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting beam failure on a secondary cell (SCell), wherein the UE is configured with a primary cell (PCell) and the SCell for carrier aggregation with a base station; identifying one or more resources for transmission of a beam failure recovery request based at least in part on detecting the beam failure, wherein the one or more resources are on one or more SCells configured for the UE; and transmitting the beam failure recovery request to the base station using the one or more resources.

In some aspects, a method of wireless communication, performed by a base station, may include communicating with a UE using a PCell and an SCell for carrier aggregation; receiving a beam failure recovery request from the UE for the SCell, wherein the beam failure recovery request is received on one or more resources of one or more SCells configured for the UE; and transmitting a beam failure recovery response to the UE based at least in part on receiving the beam failure recovery request.

In some aspects, a UE for wireless communication may include memory and one or more processors operatively coupled to the memory. The memory and the one or more processors may be configured to identify one or more resources for transmission of a beam failure recovery request based at least in part on detecting the beam failure, wherein the one or more resources are on one or more SCells configured for the UE; and transmit the beam failure recovery request to the base station using the one or more resources.

In some aspects, a base station for wireless communication may include memory and one or more processors operatively coupled to the memory. The memory and the one or more processors may be configured to communicate with a UE using a PCell and an SCell for carrier aggregation; receive a beam failure recovery request from the UE for the SCell, wherein the beam failure recovery request is received on one or more resources of one or more SCells configured for the UE; and transmit a beam failure recovery response to the UE based at least in part on receiving the beam failure recovery request.

In some aspects, a non-transitory computer-readable medium may store one or more instructions for wireless communication. The one or more instructions, when executed by one or more processors of a UE, may cause the one or more processors to: identify one or more resources for transmission of a beam failure recovery request based at least in part on detecting the beam failure, wherein the one or more resources are on one or more SCells configured for the UE; and transmit the beam failure recovery request to the base station using the one or more resources.

In some aspects, a non-transitory computer-readable medium may store one or more instructions for wireless communication. The one or more instructions, when executed by one or more processors of a base station, may cause the one or more processors to: communicate with a UE using a PCell and an SCell for carrier aggregation; receive a beam failure recovery request from the UE for the SCell, wherein the beam failure recovery request is received on one or more resources of one or more SCells configured for the UE; and transmit a beam failure recovery response to the UE based at least in part on receiving the beam failure recovery request.

In some aspects, an apparatus for wireless communication may include means for detecting beam failure on an SCell, wherein the apparatus is configured with a PCell and the SCell for carrier aggregation with a base station; means for identifying one or more resources for transmission of a beam failure recovery request based at least in part on detecting the beam failure, wherein the one or more resources are on one or more SCells configured for the apparatus; and means for transmitting the beam failure recovery request to the base station using the one or more resources.

In some aspects, an apparatus for wireless communication may include means for communicating with a UE using a PCell and an SCell for carrier aggregation; means for receiving a beam failure recovery request from the UE for the SCell, wherein the beam failure recovery request is received on one or more resources of one or more SCells configured for the UE; and means for transmitting a beam failure recovery response to the UE based at least in part on receiving the beam failure recovery request.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
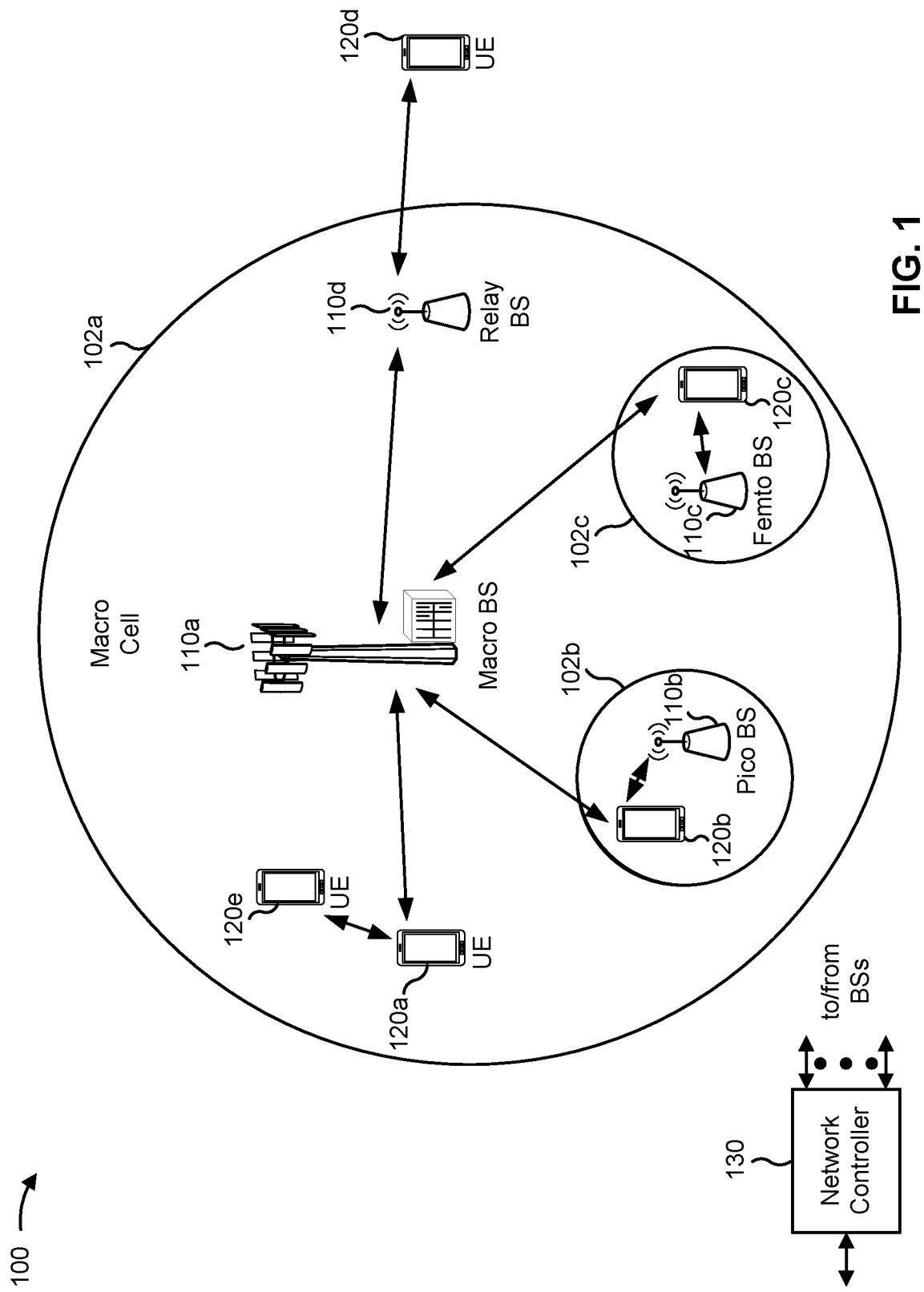
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
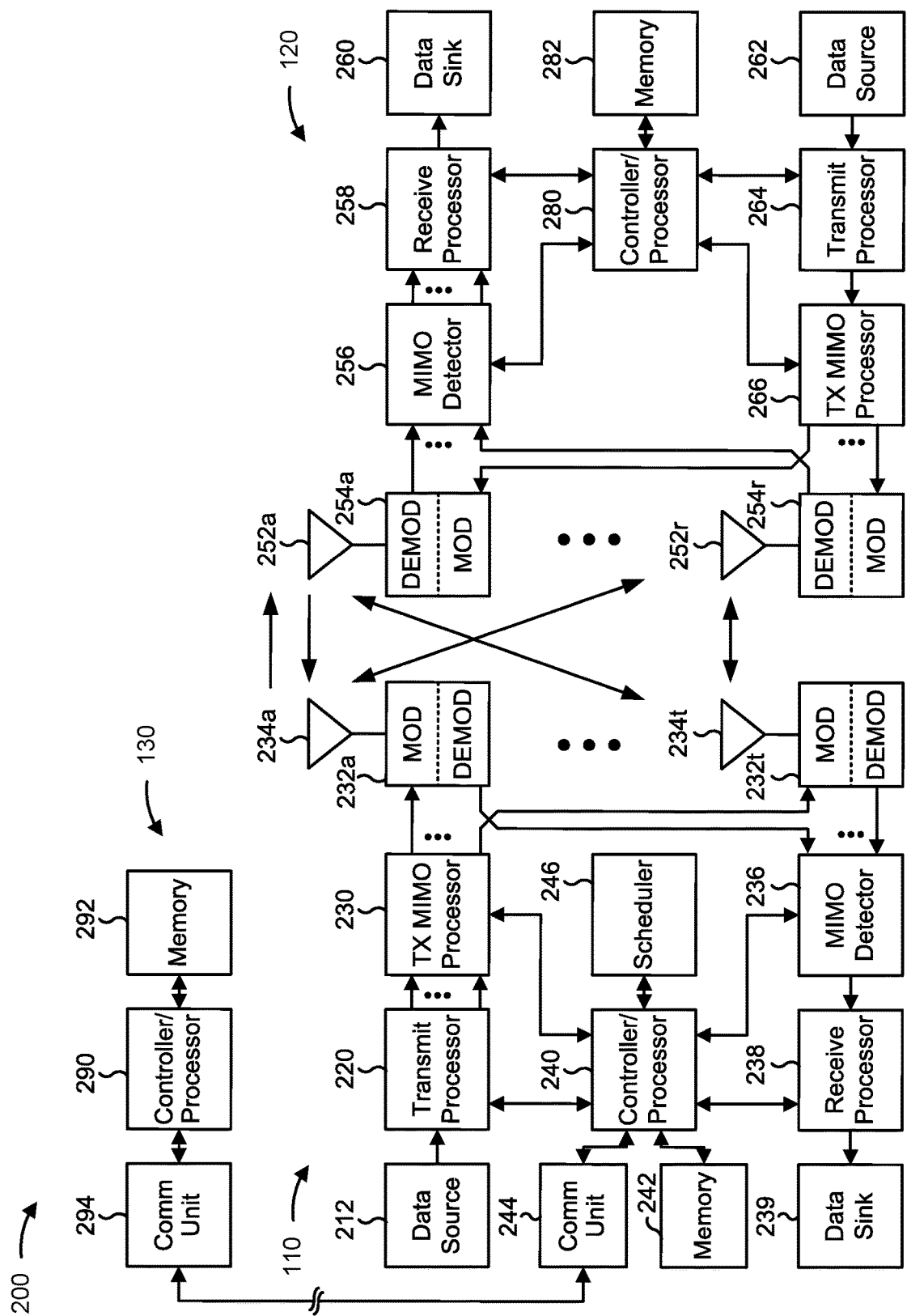
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmission of a beam failure recovery request via a secondary cell used for carrier aggregation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for detecting beam failure on an SCell, wherein UE 120 is configured with a PCell and the SCell for carrier aggregation with a base station; means for identifying one or more resources for transmission of a beam failure recovery request based at least in part on detecting the beam failure, wherein the one or more resources are on one or more SCells configured for UE 120; means for transmitting the beam failure recovery request to the base station using the one or more resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for communicating with a UE using a PCell and an SCell for carrier aggregation; means for receiving a beam failure recovery request from the UE for the SCell, wherein the beam failure recovery request is received on one or more resources of one or more SCells configured for the UE; means for transmitting a beam failure recovery response to the UE based at least in part on receiving the beam failure recovery request; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
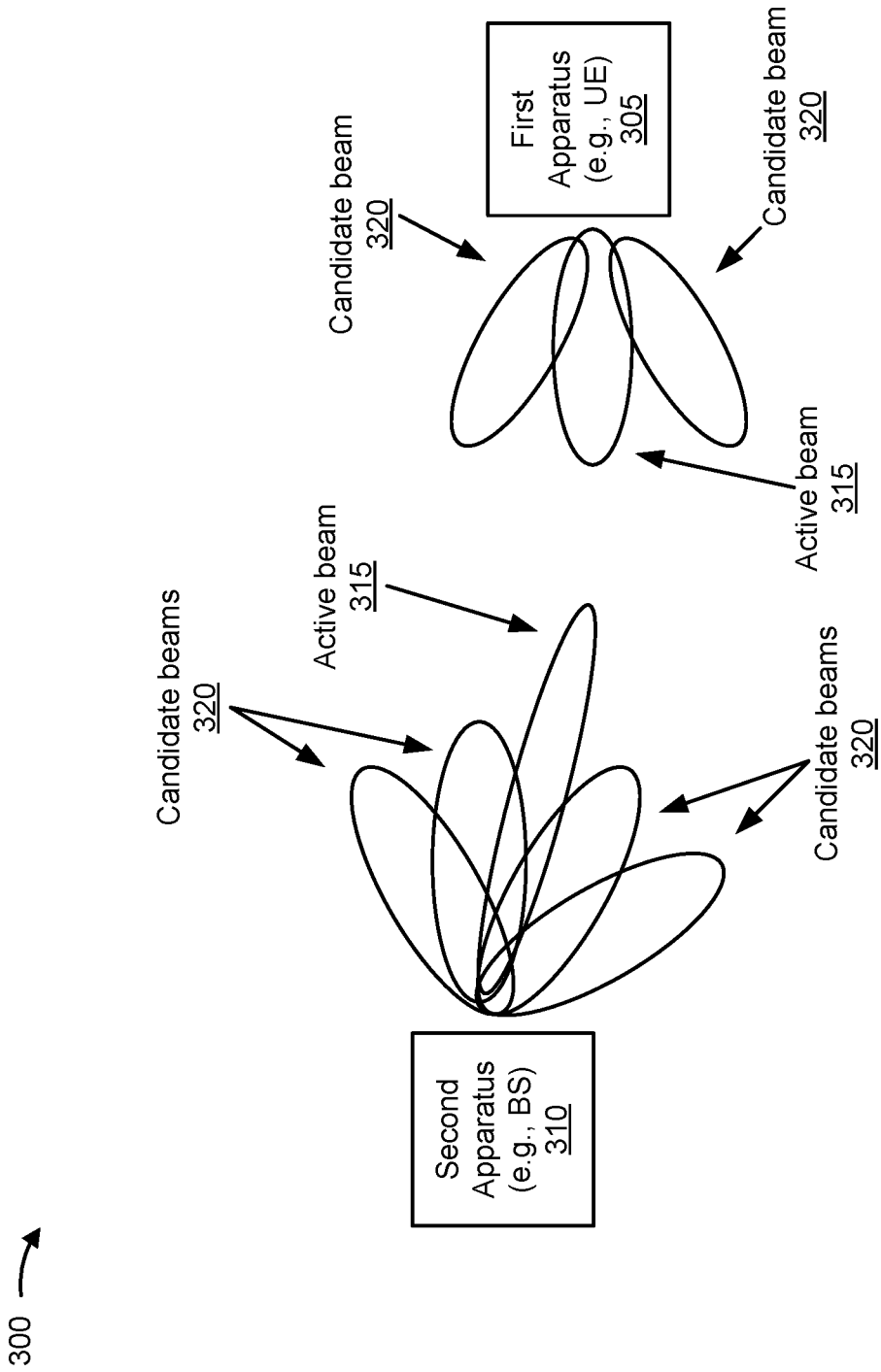
FIG. 3 is a diagram illustrating an example of wireless communication via one or more beams, in accordance with certain aspects of the present disclosure.

FIG. 3 is a diagram illustrating an example 300 of wireless communication via one or more beams, in accordance with certain aspects of the present disclosure.

As shown in FIG. 3, a first apparatus 305 (e.g., shown as a UE in example 300) may communicate with a second apparatus 310 (e.g., shown as a base station in example 300) using one or more active beams 315. In some aspects, the first apparatus 305 and the second apparatus 310 may also be capable of communicating via one or more candidate beams 320. In some aspects, an active beam 315 may be selected from a set of candidate beams 320 by comparing beam parameters (e.g., RSRP, RSRQ, RSSI, and/or the like) of the set of candidate beams 320. For example, an active beam 315 may be the beam that has the best beam parameters among all beams in the set of candidate beams 320. In some aspects, the beams may operate in a millimeter wave radio frequency band.

In some aspects, if the active beam 315 experiences a failure, the first apparatus 305 may perform a beam failure recovery procedure. For example, upon detecting the failure of the active beam 315, the first apparatus 305 may attempt to communicate with the second apparatus 310 by transmitting a beam failure recovery request (BFRQ) via one or more candidate beams 320. However, this procedure increases in complexity if the first apparatus 305 and the second apparatus 310 are communicating using carrier aggregation, where there are multiple possible cells (e.g., a primary cell and one or more secondary cells, which may be included in one or more secondary cell groups) via which a BFRQ could be transmitted. Some techniques and apparatuses described herein assist with transmission of a beam failure recovery request via a secondary cell used for carrier aggregation.

As indicated above, FIG. 3 is provided as an example. Other examples may differ from what is described with regard to FIG. 3.

Figure 4:
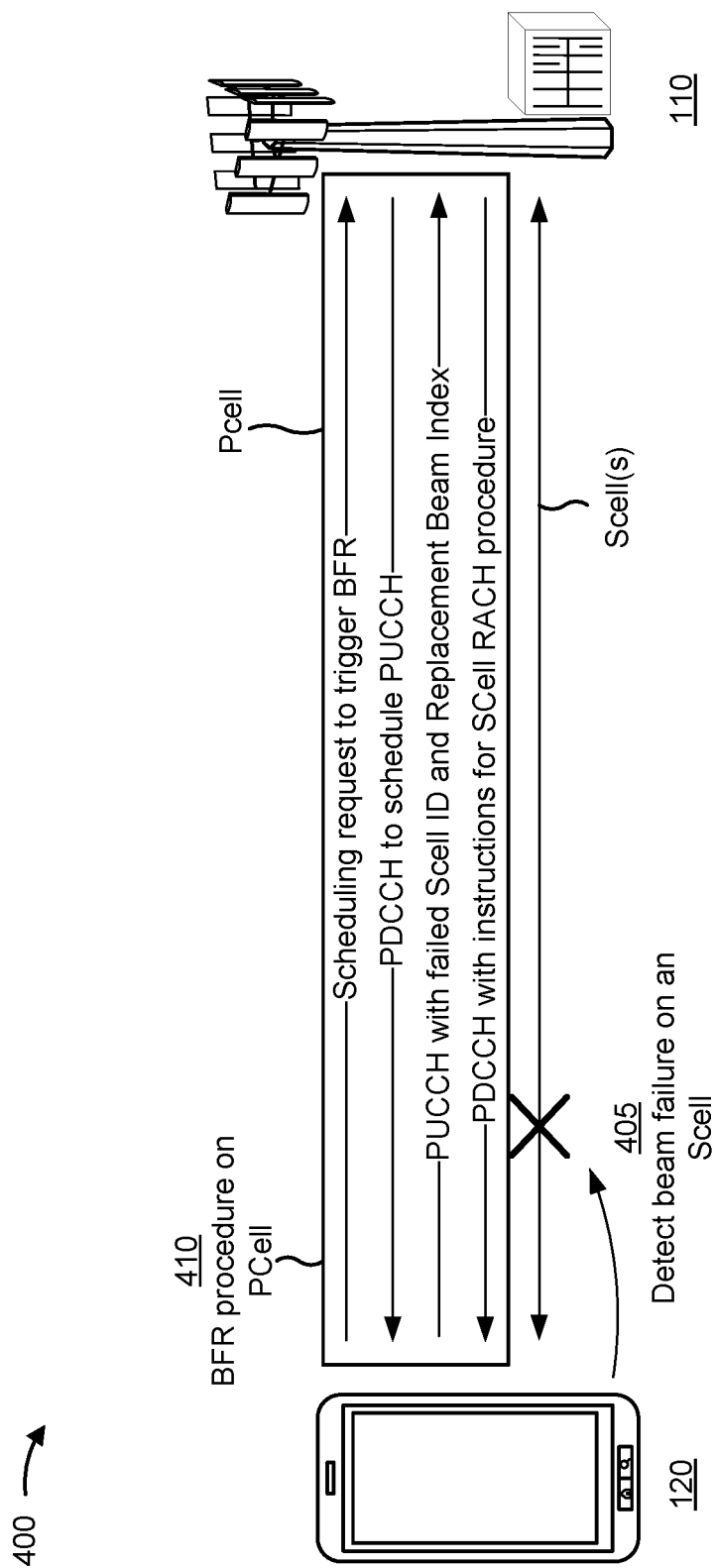
FIG. 4 is a diagram illustrating an example of a beam failure recovery procedure, in accordance with certain aspects of the present disclosure.

FIG. 4 is a diagram illustrating an example 400 of a beam failure recovery procedure, in accordance with certain aspects of the present disclosure.

As shown in FIG. 4, a base station 110 and a UE 120 may communicate with one another using carrier aggregation. Using carrier aggregation, the base station 110 and the UE 120 may communicate with one another using a primary cell (PCell) and one or more secondary cells (SCells). In example 400, the SCells are DL-only SCells, meaning that the SCells are configured for only downlink communications, and are not configured for uplink communications.

As shown by reference number 405, the UE 120 may detect beam failure on a DL-only SCell. As shown by reference number 410, the UE 120 and the base station 110 may perform a beam failure recovery procedure using the PCell. For example, the UE 120 may transmit a scheduling request on the PCell via a physical uplink control channel (PUCCH). The scheduling request may trigger beam failure recovery (BFR). Based at least in part on receiving the scheduling request, the base station 110 may transmit, on the PCell, a physical downlink shared channel (PDCCH) communication that schedules a PUCCH communication for BFR.

The UE 120 may receive the PDCCH communication, and may transmit the scheduled PUCCH communication on the PCell. The PUCCH communication may identify the SCell that experienced the beam failure and/or may indicate a candidate beam index for a candidate beam to replace the failed beam. For example, the PUCCH communication may include a medium access control (MAC) control element (CE) (collectively, MAC-CE) that identifies the failed SCell and the replacement beam. Based at least in part on receiving the PUCCH communication, the base station 110 may transmit, on the PCell, a PDCCH communication that instructs the UE 120 regarding the BFR procedure. For example, the PDCCH communication may instruct the UE 120 to perform a random access procedure for the SCell on one or more candidate beams. The UE 120 may perform BFR according to the PDCCH communication to obtain a new beam for communications on the SCell.

In some cases, one or more SCells used for carrier aggregation between the UE 120 and the base station 110 may be configured for uplink communications. In this case, a beam failure recovery procedure for an SCell may be performed that includes the UE 120 transmitting one or more uplink messages via the SCell or another SCell configured for the UE 120. In this way, a load on the PCell may be reduced. Furthermore, the UE 120 may improve reliability by increasing transmit diversity of uplink BFR messages, such as by using multiple SCells, the PCell and one or more SCells, and/or the like. However, there may be multiple options regarding which SCell (or SCells) to use for transmission of a BFRQ, which resources of the SCell (or SCells) to use for transmission of a BFRQ, whether to use the PCell in addition to one or more SCells to transmit a BFRQ, and/or the like. Some techniques and apparatuses described herein permit identification of one or more resources and/or one or more SCells for transmission of a BFRQ. In some cases, a resource and/or an SCell may be selected to reduce ambiguity between the UE 120 and the base station 110, to improve reliability, to reduce latency, to provide transmit diversity, to balance a load across carriers, and/or the like.

As indicated above, FIG. 4 is provided as an example. Other examples may differ from what is described with regard to FIG. 4.

Figure 5:
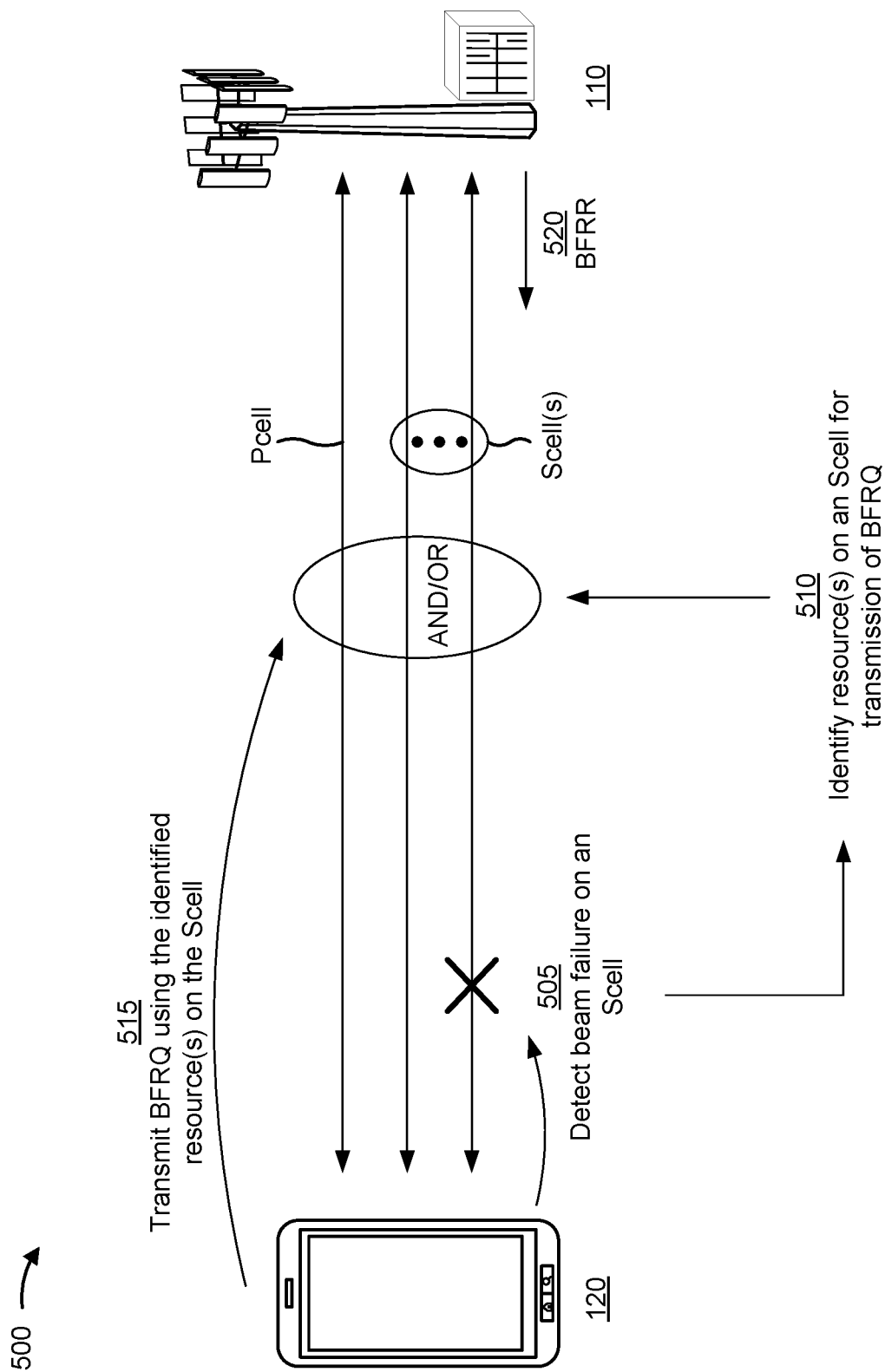
FIG. 5 is a diagram illustrating an example of transmission of a beam failure recovery request via a secondary cell used for carrier aggregation, in accordance with various aspects of the present disclosure.

FIG. 5 is a diagram illustrating an example 500 of transmission of a beam failure recovery request via a secondary cell used for carrier aggregation, in accordance with various aspects of the present disclosure.

As shown in FIG. 5, a UE 120 and a base station 110 may communicate with one another using carrier aggregation. Using carrier aggregation, the UE 120 and the base station 110 may communicate with one another using a PCell and one or more SCells. In example 500, one or more of the SCells may be configured for uplink communications. In some aspects, one or more of the SCells may be configured for both uplink communications and downlink communications. In some aspects, the base station 110 may configure the PCell and the one or more SCells for the UE 120, such as by using a configuration indicated in a radio resource control (RRC) message (e.g., an RRC configuration message, an RRC reconfiguration message, and/or the like).

As shown by reference number 505, the UE 120 may detect a beam failure on an SCell (e.g., an SCell configured for the UE 120). In some aspects, the beam failure may be a full failure of all channels (e.g., control channels, data channels, and/or the like) associated with the UE 120 and/or the SCell. In some aspects, the beam failure is a partial failure of the channels (e.g., a failure of one or more channels, a failure of a subset of channels, and/or the like) associated with the UE 120 and/or the SCell.

As shown by reference number 510, the UE 120 may identify one or more resources for transmission of a beam failure recovery request (BFRQ) based at least in part on detecting the beam failure. In some aspects, the one or more resources are on one or more SCells configured for the UE 120 (e.g., one or more SCells that support uplink communications). For example, the UE 120 may identify one or more time domain resources, one or more frequency domain resources, one or more spatial domain resources, and/or the like, on an SCell. As shown, in addition to identifying one or more resources on an SCell for transmission of the BFRQ, the UE 120 may identify one or more resources on the PCell for transmission of the BFRQ, as described in more detail below.

A BFRQ may indicate that a beam has failed. In some aspects, the BFRQ may identify the failed beam, may identify an SCell identifier that identifies the SCell on which the beam has failed, may identify a candidate beam (e.g., using a beam index) to replace the failed beam, and/or the like.

In some aspects, the UE 120 may identify a set of SCells (e.g., one or more SCells) on which the BFRQ is to be transmitted. The UE 120 may then identify one or more resources, for transmission of the BFRQ, on each SCell included in the set of SCells. In some aspects, the set of SCells may include all SCells, configured for the UE 120, that support uplink communications. In this way, the UE 120 may improve reliability using transmit diversity, and may increase the likelihood that the BFRQ is received by the base station 110.

In some aspects, the set of SCells may include a subset of all SCells, configured for the UE 120, that support uplink communications. For example, the set of SCells may include one or more SCells for which a PUCCH resource group for BFRQ is configured. For example, the base station 110 may configure the UE 120 with a set of uplink resources (e.g., a PUCCH resource group) to be used for transmission of a BFRQ. This set of (one or more) uplink resources may be referred to herein as a set of BFRQ resources. In some aspects, the base station 110 may configure the UE 120 with a set of BFRQ resources in an RRC message. The configuration for the BFRQ resources may indicate, for example, a periodicity for the set of BFRQ resources, an offset for the set of BFRQ resources, and/or the like. In some aspects, the base station 110 may configure the UE 120 with a set of BFRQ resources for a particular SCell (e.g., a per-SCell BFRQ resource configuration). In this case, some SCells may be configured with BFRQ resources, and some SCells may not be configured with BFRQ resources. Furthermore, different SCells may be configured with different BFRQ resources. In some aspects, the set of SCells identified by the UE 120 for transmission of a BFRQ may include all SCells for which a set of BFRQ resources is configured. Alternatively, the set of SCells identified by the UE 120 for transmission of a BFRQ may include a subset of all SCells for which a set of BFRQ resources is configured. In this way, network resources may be conserved as compared to transmitting a BFRQ on all SCells, and the base station 110 may conserve base station resources (e.g., memory resources, processing resources, and/or the like) by monitoring for the BFRQ on fewer than all SCells configured for the UE 120.

In some aspects, the UE 120 may be configured with one or more SCell groups that each include a set of SCells. For example, an SCell group may include multiple SCells included in the same frequency band (e.g., different sub-bands of the same frequency band). As another example, an SCell group may include multiple SCells with beams that are quasi co-located with one another (e.g., the beams of the SCells in the SCell group have the same quasi co-location (QCL) relationship). In some aspects, a single SCell in an SCell group may be designated as or configured as a secondary primary cell (Spcell). In some aspects, the set of SCells identified by the UE 120 for transmission of a BFRQ may include all Spcells configured for the UE 120. Alternatively, the set of SCells identified by the UE 120 for transmission of a BFRQ may include a subset of all Spcells configured for the UE 120. In this way, network resources may be conserved as compared to transmitting a BFRQ on all SCells, and the base station 110 may conserve base station resources (e.g., memory resources, processing resources, and/or the like) by monitoring for the BFRQ on fewer than all SCells configured for the UE 120.

In some aspects, only a single SCell, in the SCell group, may be permitted to be configured with a PUCCH group for BFRQ. In other words, an SCell group may be configured with a maximum of one SCell that is configured with a PUCCH group for BFRQ. In this case, either zero SCells or one SCell in the SCell group may be configured with a PUCCH group for BFRQ. In some aspects, the SCell that is configured with the PUCCH group for BFRQ may be the same SCell that is the secondary primary cell for the SCell group. In some aspects, the set of SCells identified by the UE 120 for transmission of a BFRQ may include the single SCell, in an SCell group, that is configured with a PUCCH group for BFRQ. In some aspects, the set of SCells identified by the UE 120 for transmission of a BFRQ may include multiple SCells configured with a PUCCH group for BFRQ, where each of the multiple SCells is in a different SCell group.

In some aspects, the set of SCells identified by the UE 120 for transmission of a BFRQ may include one or more SCells other than the SCell for which the beam failure is detected. In this way, the UE 120 may increase a likelihood of reception of the BFRQ by the base station 110, as compared to transmitting the BFRQ on the SCell that experiences a beam failure. For example, the set of SCells identified by the UE 120 for transmission of a BFRQ may include one or more SCells that are in a different SCell group (or different SCell groups) than the SCell for which the beam failure is detected. Because SCells in an SCell group may have beams that are quasi co-located with one another, transmission of the BFRQ in a different SCell group may increase the likelihood of reception of the BFRQ by the base station 110 (e.g., may improve reliability).

In some aspects, the set of SCells identified by the UE 120 for transmission of a BFRQ may include one or more SCells that are in the same SCell group as the SCell for which the beam failure is detected. This may reduce complexity as compared to using a different SCell group. However, to improve reliability, the set of SCells identified by the UE 120 for transmission of a BFRQ may include one or more SCells for which a PUCCH is configured on a different beam than a beam of the SCell for which the beam failure is detected. This may avoid transmission of the BFRQ on a failed beam, thereby improving reliability.

In some aspects, the UE 120 may identify the set of SCells for transmission of a BFRQ based at least in part on performing channel measurements. For example, the UE 120 may perform channel measurements on SCells configured for the UE 120 (e.g., all SCells of the UE 120, all SCells of the UE 120 that support uplink communications, a subset of SCells of the UE 120 that satisfy a condition, and/or the like). The UE 120 may identify an SCell with the best channel measurement (e.g., the best RSRP parameter), with a channel measurement that satisfies a threshold (e.g., an RSRP parameter that satisfies a threshold), and/or the like. In this way, the UE 120 may improve reliability for the BFRQ.

In some aspects, the UE 120 may identify the set of SCells for transmission of a BFRQ based at least in part on a BFRQ resource configuration associated with each of the SCells. As described above, different SCells may be configured with different BFRQ resources. As a result, BFRQ resources on different SCells may occur at different times. In some aspects, the UE 120 may identify an SCell with a BFRQ resource that occurs earlier in time or earliest in time, after detection of the beam failure, as compared to other SCells (e.g., as compared to all SCells of the UE 120, all SCells of the UE 120 that support uplink communications, a subset of SCells of the UE 120 that satisfy a condition, and/or the like). Additionally, or alternatively, the UE 120 may identify an SCell with a BFRQ resource that satisfies a condition (e.g., that occurs within a threshold amount of time after detection of the beam failure). In this way, the UE 120 may reduce latency for the BFRQ.

In some aspects, the UE 120 may identify the set of SCells for transmission of a BFRQ based at least in part on a rule that is prespecified (e.g., a rule specified in a wireless communication standard). Additionally, or alternatively, the UE 120 may identify the set of SCells for transmission of a BFRQ based at least in part on a rule that is indicated by the base station 110 (e.g., in an RRC message, a MAC-CE, and/or the like). In some aspects, the rule may be based at least in part on an SCell identifier. For example, the set of SCells identified by the UE 120 may have smaller SCell identifiers (e.g., smaller index values) than other SCells configured for the UE 120 (e.g., may have the smallest SCell identifier or identifiers), may have larger SCell identifiers (e.g., larger index values) than other SCells configured for the UE 120 (e.g., may have the largest SCell identifier or identifiers), may have particular SCell identifiers indicated by the rule, and/or the like.

In some aspects, the UE 120 may identify the set of SCells for transmission of a BFRQ based at least in part on an indication from the base station 110. For example, the base station 110 may indicate, to the UE 120, the set of SCells that are to be used for transmission of a BFRQ. The indication from the base station 110 may be included in, for example, an RRC message, a MAC-CE, and/or the like.

In some aspects, the UE 120 may identify the set of SCells for transmission of a BFRQ based at least in part on identifying one or more SCells for which a BFRQ resource is configured. If a BFRQ resource is not configured for an SCell, then the UE 120 may refrain from identifying that SCell for transmission of a BFRQ (e.g., at least for a procedure that uses configured BFRQ resources to transmit a BFRQ). Additionally, or alternatively, the UE 120 may identify the set of SCells for transmission of a BFRQ based at least in part on identifying one or more SCells for which a set of contention-free random access (CFRA) resources is configured. If a CFRA resource is not configured for an SCell, then the UE 120 may refrain from identifying that SCell for transmission of a BFRQ (e.g., at least for a procedure that uses configured CFRA resources to transmit a BFRQ). Thus, the set of SCells identified by the UE 120 may be configured with a BFRQ resource (e.g., a PUCCH group for BFRQ), a CFRA resource, and/or the like.

In some aspects, the UE 120 may use a combination of techniques described above to identify the one or more SCells for transmission of the BFRQ. For example, the UE 120 may identify a first set of SCells, of all SCells configured by the UE 120, that satisfy a first condition. The first condition may be used to identify, for example, a set of SCells that support uplink communications, a set of SCells for which a BFRQ resource is configured, a set of SCells for which a CFRA resource is configured, a set of SCells that are Spcells of an SCell group, and/or the like. After identifying the first set of SCells, the UE 120 may then identify a second set of SCells, of the first set of SCells, that satisfy a second condition. The second condition may by used to identify, for example, a set of SCells in a certain SCell group (e.g., the same SCell group as the failed SCell or a different SCell group than the failed SCell), a set of SCells associated with a channel measurement that satisfies a condition (e.g., the best channel measurement(s)), a set of SCells associated with a BFRQ resource that satisfies a condition (e.g., the earliest-occurring BFRQ resource(s)), and/or the like.

As shown by reference number 515, the UE 120 may transmit the BFRQ to the base station 110 using at least the one or more resources on the SCell. For example, the UE 120 may identify one or more SCells for transmission of the BFRQ, as described above. The UE 120 may identify one or more resources, of the identified one or more SCells. For example, the one or more resources may include one or more BFRQ resources of the one or more SCells (e.g., for a procedure where the UE 120 uses configured BFRQ resources to transmit a BFRQ), may include one or more CFRA resources of the one or more SCells (e.g., for a procedure where the UE 120 uses configured CFRA resources to transmit a BFRQ), and/or the like. The UE 120 may transmit the BFRQ on the identified one or more resources.

In some aspects, the UE 120 may transmit a BFRQ on only one or more SCells, and may refrain from transmitting a BFRQ on the PCell. In this way, the UE 120 may reduce a load on the PCell. Alternatively, the UE 120 may transmit a BFRQ on the PCell and on the one or more SCells. In this way, the UE 120 may improve transmit diversity. In some aspects, if the UE 120 is not able to identify any SCells for transmission of the BFRQ (e.g., when none of the SCells of the UE 120 are configured with BFRQ resources and/or CFRA resources), then the UE 120 may transmit the BFRQ on the PCell, and may refrain from transmitting the BFRQ on any SCells.

In some aspects, the one or more resources identified by the UE 120 may includes multiple resources on multiple (different) channels. For example, the UE 120 may transmit a BFRQ using a two-step BFRQ procedure, which may include a first transmission (e.g., a scheduling request) on a first channel (e.g., a PUCCH) and a second transmission (e.g., indicating an SCell identifier of the SCell with the failed beam, indicating a candidate beam to replace the failed beam, and/or the like) on a second channel (e.g., a PUSCH). In some aspects, the multiple channels (e.g., the first channel and the second channel) may be on the same cell or component carrier (e.g., the same SCell). In some aspects, the multiple channels may be on different cells. For example, the first channel may be on a first SCell, and the second channel may be on a second SCell. As another example, the first channel may be on an SCell, and the second channel may be on the PCell. As another example, the first channel may be on the PCell, and the second channel may be on an SCell.

As shown by reference number 520, based at least in part on receiving the BFRQ, the base station 110 may transmit a beam failure recovery response (BFRR) to the UE 120. In some aspects, the BFRR is transmitted on the PCell. In some aspects, the BFRR is transmitted on one or more of the SCells used by the UE 120 to transmit the BFRQ. For example, the BFRR may be transmitted on the same SCell used by the UE 120 to transmit the BFRQ. In some aspects, the BFRR may be transmitted on multiple SCells (e.g., if the UE 120 uses multiple SCells to transmit the BFRQ).

In some aspects, the BFRR includes an acknowledgement (ACK), such as an ACK to a MAC-CE transmitted by the UE 120 in a PUSCH of a two-step BFRQ procedure. In the two-step BFRQ procedure, the UE 120 may transmit a MAC-CE that indicates a candidate beam. In this case, the BFRR may be an ACK to the MAC-CE, and may indicate that the base station 110 approves or acknowledges the indicated candidate beam for subsequent communications on the failed SCell. Alternatively, the base station 110 may indicate a different beam for the failed SCell than the beam indicated by the UE 120. The two-step BFRQ procedure may be a procedure where the UE 120 uses configured BFRQ resources to perform beam failure recovery.

In some aspects, the BFRR includes a PDCCH communication, such as a PDCCH order for a CFRA procedure that is part of a one-step BFRQ procedure. In the one-step BFRQ procedure, the UE 120 notifies the base station 110 of beam failure, and the base station 110 uses the PDCCH communication to instruct the UE 120 to perform a CFRA procedure to identify a candidate beam to replace the failed beam of the SCell. The one-step BFRQ procedure may be a procedure where the UE 120 uses configured CFRA resources to perform beam failure recovery.

By using one or more SCells to transmit a BFRQ, the UE 120 may reduce a load on the PCell, may reduce ambiguity between the UE 120 and the base station 110 (e.g., by following a rule or identifying SCells in a manner common to both the UE 120 and the base station 110), may improve reliability, may reduce latency, may provide transmit diversity, may balance a load across cells or carriers, and/or the like.

As indicated above, FIG. 5 is provided as an example. Other examples may differ from what is described with regard to FIG. 5.

Figure 6:
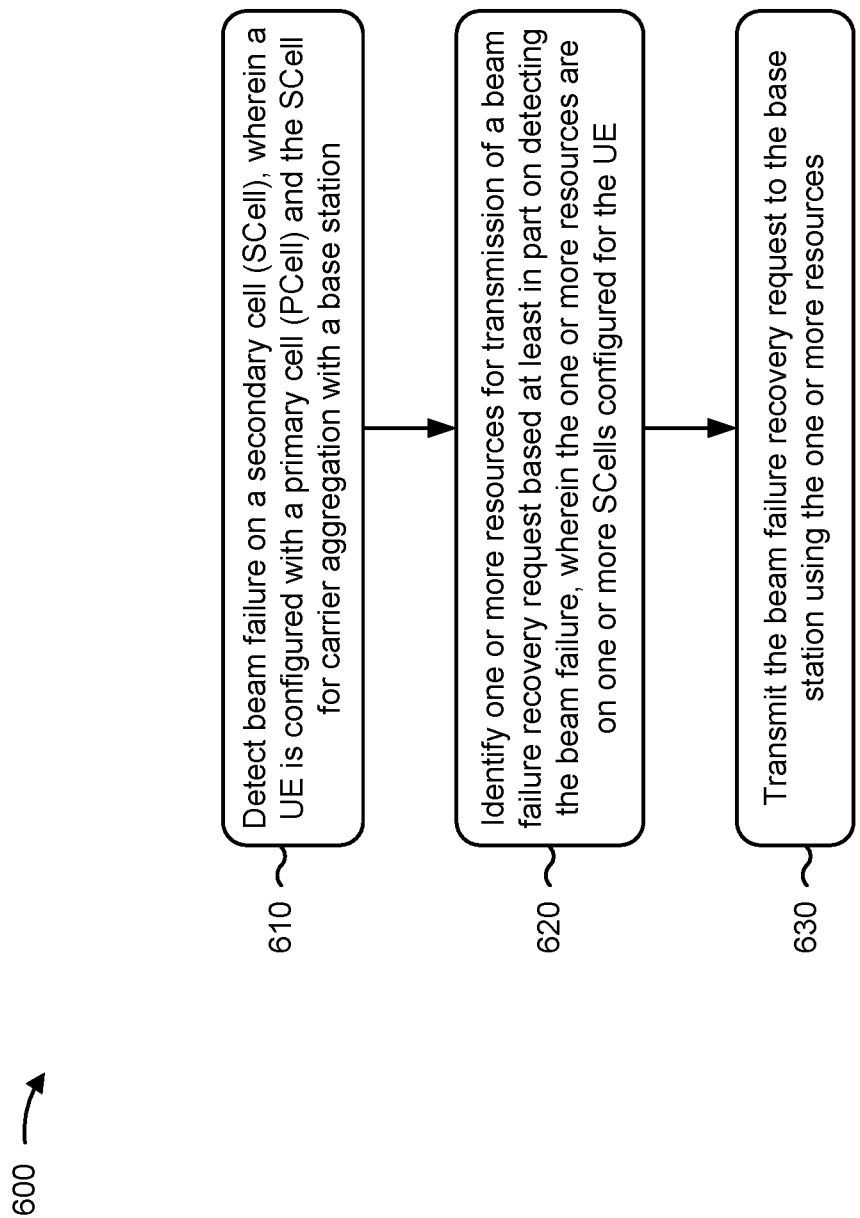
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with transmission of a beam failure recovery request via a secondary cell used for carrier aggregation.

As shown in FIG. 6, in some aspects, process 600 may include detecting beam failure on an SCell, wherein the UE is configured with a PCell and the SCell for carrier aggregation with a base station (block 610). For example, the UE (e.g., using receive processor 258, transmit processor 264, controller/processor 280, memory 282, and/or the like) may detect beam failure on an SCell, as described above. In some aspects, the UE is configured with a PCell and the SCell for carrier aggregation with a base station.

As further shown in FIG. 6, in some aspects, process 600 may include identifying one or more resources for transmission of a beam failure recovery request based at least in part on detecting the beam failure, wherein the one or more resources are on one or more SCells configured for the UE (block 620). For example, the UE (e.g., using receive processor 258, transmit processor 264, controller/processor 280, memory 282, and/or the like) may identify one or more resources for transmission of a beam failure recovery request based at least in part on detecting the beam failure, as described above. In some aspects, the one or more resources are on one or more SCells configured for the UE.

As further shown in FIG. 6, in some aspects, process 600 may include transmitting the beam failure recovery request to the base station using the one or more resources (block 630). For example, the UE (e.g., using transmit processor 264, controller/processor 280, memory 282, and/or the like) may transmit the beam failure recovery request to the base station using the one or more resources, as described above.

Process 600 may include additional aspects, such as any single aspect or any combination of aspects described below and/or in connection with one or more other processes described elsewhere herein.

In a first aspect, the one or more SCells include all SCells, configured for the UE, that support uplink communications.

In a second aspect, alone or in combination with the first aspect, the one or more SCells include one or more SCells, configured for the UE, for which a physical uplink control channel resource group for the beam failure recovery request is configured.

In a third aspect, alone or in combination with one or more of the first and second aspects, the one or more SCells include one or more secondary primary cells of one or more SCell groups configured for the UE.

In a fourth aspect, alone or in combination with one or more of the first through third aspects, the one or more SCells are in a different SCell group than the SCell for which the beam failure is detected.

In a fifth aspect, alone or in combination with one or more of the first through fourth aspects, the one or more SCells are in a same SCell group as the SCell for which the beam failure is detected.

In a sixth aspect, alone or in combination with one or more of the first through fifth aspects, the one or more SCells have respective physical uplink control channels configured on a different beam than a beam of the SCell for which the beam failure is detected.

In a seventh aspect, alone or in combination with one or more of the first through sixth aspects, the one or more SCells are identified based at least in part on channel measurements performed by the UE.

In an eighth aspect, alone or in combination with one or more of the first through seventh aspects, the one or more SCells are associated with a channel measurement that satisfies a condition or a threshold.

In a ninth aspect, alone or in combination with one or more of the first through eighth aspects, the one or more SCells are associated with a beam failure recovery request resource that occurs earlier in time than beam failure recovery request resources of one or more other SCells configured for the UE.

In a tenth aspect, alone or in combination with one or more of the first through ninth aspects, the one or more SCells are associated with a beam failure recovery request resource that occurs earliest in time, after detection of the beam failure, as compared to beam failure recovery request resources of all other SCells configured for the UE.

In an eleventh aspect, alone or in combination with one or more of the first through tenth aspects, the one or more SCells are configured with at least one of a physical uplink control channel resource group for the beam failure recovery request, a contention-free random access resource, or a combination thereof.

In a twelfth aspect, alone or in combination with one or more of the first through eleventh aspects, process 600 includes transmitting the beam failure recovery request on the PCell.

In a thirteenth aspect, alone or in combination with one or more of the first through twelfth aspects, the one or more SCells, on which the beam failure recovery request is to be transmitted, are identified based at least in part on respective SCell identifiers of the one or more SCells.

In a fourteenth aspect, alone or in combination with one or more of the first through thirteenth aspects, the one or more SCells, on which the beam failure recovery request is to be transmitted, are indicated by a base station in a radio resource control message, a medium access control (MAC) control element, or a combination thereof.

In a fifteenth aspect, alone or in combination with one or more of the first through fourteenth aspects, the beam failure recovery request is transmitted using multiple channels, and the multiple channels are on different cells.

In a sixteenth aspect, alone or in combination with one or more of the first through fifteenth aspects, the beam failure recovery response is received on the PCell.

In a seventeenth aspect, alone or in combination with one or more of the first through sixteenth aspects, the beam failure recovery request is received on at least one SCell of the one or more SCells.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with various aspects of the present disclosure. Example process 700 is an example where the base station (e.g., base station 110 and/or the like) performs operations associated with transmission of a beam failure recovery request via a secondary cell used for carrier aggregation.

As shown in FIG. 7, in some aspects, process 700 may include communicating with a UE using a PCell and an SCell for carrier aggregation (block 710). For example, the base station (e.g., using transmit processor 220, receive processor 238, controller/processor 240, memory 242, and/or the like) may communicate with a UE using a PCell and an SCell for carrier aggregation, as described above.

As further shown in FIG. 7, in some aspects, process 700 may include receiving a beam failure recovery request from the UE for the SCell, wherein the beam failure recovery request is received on one or more resources of one or more SCells configured for the UE (block 720). For example, the base station (e.g., using receive processor 238, controller/processor 240, memory 242, and/or the like) may receive a beam failure recovery request from the UE for the SCell, as described above. In some aspects, the beam failure recovery request is received on one or more resources of one or more SCells configured for the UE.

As further shown in FIG. 7, in some aspects, process 700 may include transmitting a beam failure recovery response to the UE based at least in part on receiving the beam failure recovery request (block 730). For example, the base station (e.g., using transmit processor 220, controller/processor 240, memory 242, and/or the like) may transmit a beam failure recovery response to the UE based at least in part on receiving the beam failure recovery request, as described above.

Process 700 may include additional aspects, such as any single aspect or any combination of aspects described below and/or in connection with one or more other processes described elsewhere herein.

In a first aspect, the one or more SCells include all SCells, configured for the UE, that support uplink communications.

In a second aspect, alone or in combination with the first aspect, the one or more SCells include one or more SCells, configured for the UE, for which a physical uplink control channel resource group for the beam failure recovery request is configured.

In a third aspect, alone or in combination with one or more of the first and second aspects, the one or more SCells include one or more secondary primary cells of one or more SCell groups configured for the UE.

In a fourth aspect, alone or in combination with one or more of the first through third aspects, the one or more SCells are in a different SCell group than the SCell for which the beam failure is detected.

In a fifth aspect, alone or in combination with one or more of the first through fourth aspects, the one or more SCells are in a same SCell group as the SCell for which the beam failure is detected.

In a sixth aspect, alone or in combination with one or more of the first through fifth aspects, the one or more SCells have respective physical uplink control channels configured on a different beam than a beam of the SCell for which the beam failure is detected.

In a seventh aspect, alone or in combination with one or more of the first through sixth aspects, the one or more SCells are associated with a beam failure recovery request resource that occurs earlier in time than beam failure recovery request resources of one or more other SCells configured for the UE.

In an eighth aspect, alone or in combination with one or more of the first through seventh aspects, the one or more SCells are associated with a beam failure recovery request resource that occurs earliest in time, after detection of the beam failure, as compared to beam failure recovery request resources of all other SCells configured for the UE.

In a ninth aspect, alone or in combination with one or more of the first through eighth aspects, the one or more SCells are configured with at least one of a physical uplink control channel resource group for the beam failure recovery request, a contention-free random access resource, or a combination thereof.

In a tenth aspect, alone or in combination with one or more of the first through ninth aspects, process 700 includes receiving the beam failure recovery request on the PCell.

In an eleventh aspect, alone or in combination with one or more of the first through tenth aspects, the one or more SCells are identified based at least in part on respective SCell identifiers of the one or more SCells.

In a twelfth aspect, alone or in combination with one or more of the first through eleventh aspects, process 700 includes indicating, to the UE, the one or more SCells in a radio resource control message, a medium access control (MAC) control element, or a combination thereof.

In a thirteenth aspect, alone or in combination with one or more of the first through twelfth aspects, the beam failure recovery request is received using multiple channels, and the multiple channels are on different cells.

In a fourteenth aspect, alone or in combination with one or more of the first through thirteenth aspects, the beam failure recovery response is transmitted on the PCell.

In a fifteenth aspect, alone or in combination with one or more of the first through fourteenth aspects, the beam failure recovery request is transmitted on at least one SCell of the one or more SCells.

In a sixteenth aspect, alone or in combination with one or more of the first through fifteenth aspects, only a single SCell in an SCell group is permitted to be configured with a physical uplink control channel resource group for the beam failure recovery request, and the one or more SCells include the single SCell.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    detecting beam failure on a secondary cell (SCell), wherein the UE is configured with a primary cell (PCell) and the SCell for carrier aggregation with a network entity;
    identifying a plurality of resources for transmission of a plurality of beam failure recovery requests based at least in part on detecting the beam failure, wherein the plurality of resources are on a plurality of SCells configured for the UE,
        wherein the plurality of SCells, on which the plurality of beam failure recovery requests are to be transmitted, are indicated by a rule indicating that the plurality of SCells are to be identified based at least in part on:
            the plurality of SCells being associated with channel measurement conditions that satisfy a condition or threshold, and
        wherein the plurality of SCells includes all SCells, configured for the UE, that satisfy the condition or the threshold; and
    transmitting the beam failure recovery requests to the network entity using the plurality of resources.

2. The method of claim 1, wherein the plurality of SCells are configured with at least one of a physical uplink control channel resource group for a beam failure recovery request, a contention-free random access resource, or a combination thereof.

3. The method of claim 1, wherein the plurality of more SCells include one or more Scells, configured for the UE, for which a physical uplink control channel resource group for a beam failure recovery request is configured.

4. The method of claim 1, wherein only a single SCell in an SCell group is permitted to be configured with a physical uplink control channel resource group for a beam failure recovery request, and wherein the plurality of SCells include the single SCell.

5. The method of claim 1, wherein the plurality of SCells include one or more secondary primary cells of one or more Scell groups configured for the UE.

6. The method of claim 1, further comprising transmitting another beam failure recovery request on the PCell.

7. The method of claim 1, wherein the plurality of SCells are in a same SCell group as the SCell for which the beam failure is detected.

8. The method of claim 1, wherein the plurality of SCells are in a different SCell group than the SCell for which the beam failure is detected.

9. The method of claim 1, wherein the condition is satisfied by the plurality of SCells supporting uplink communications.

10. The method of claim 1, wherein the plurality of SCells have respective physical uplink control channels configured on a different beam than a beam of the SCell for which the beam failure is detected.

11. The method of claim 1, wherein channel measurements, associated with the channel measurement conditions, are performed by the UE.

12. The method of claim 1, wherein the plurality of SCells are associated with beam failure recovery request resources that occur earlier in time than beam failure recovery request resources of one or more other SCells configured for the UE.

13. The method of claim 1, wherein one of the plurality of SCells is associated with a beam failure recovery request resource that occurs earliest in time, after detection of the beam failure, as compared to other beam failure recovery request resources of all other SCells configured for the UE.

14. The method of claim 1, wherein at least one of the beam failure recovery requests are transmitted using multiple channels, and the multiple channels are on different cells.

15. The method of claim 1, further comprising receiving a beam failure recovery response from the network entity, wherein the beam failure recovery response is received on the PCell.

16. The method of claim 1, further comprising receiving a beam failure recovery response from the network entity, wherein the beam failure recovery response is received on at least one SCell of the plurality of SCells.

17. A method of wireless communication performed by a network entity, comprising:
communicating with a user equipment (UE) using a primary cell (PCell) and a secondary cell (SCell) for carrier aggregation;
indicating, to the UE, a rule indicating that a plurality of SCells are to be used for transmission of a plurality of beam failure recovery requests based at least in part on:
the plurality of SCells being associated with channel measurement conditions that satisfy a condition or threshold;
receiving the beam failure recovery requests from the UE for the plurality of SCells, wherein the beam failure recovery requests are received from all SCells, configured for the UE, that satisfy the condition or the threshold; and
transmitting a beam failure recovery response to the UE based at least in part on receiving the beam failure recovery requests.

18. The method of claim 17, wherein the plurality of SCells include one or more SCells, configured for the UE, for which a physical uplink control channel resource group for a beam failure recovery request is configured.

19. The method of claim 17, wherein the plurality of SCells are configured with at least one of a physical uplink control channel resource group for a beam failure recovery request, a contention-free random access resource, or a combination thereof.

20. The method of claim 17, wherein only a single SCell in an SCell group is permitted to be configured with a physical uplink control channel resource group for a beam failure recovery request, and wherein the plurality of SCells include the single SCell.

21. The method of claim 17, wherein the plurality of SCells include one or more secondary primary cells of one or more SCell groups configured for the UE.

22. The method of claim 17, further comprising receiving another beam failure recovery request on the PCell.

23. A user equipment (UE) for wireless communication, comprising:
a memory; and
one or more processors coupled to the memory and configured to cause the UE to:
detect beam failure on a secondary cell (SCell), wherein the UE is configured with a primary cell (PCell) and the SCell for carrier aggregation with a network entity;
identify a plurality of resources for transmission of a plurality of beam failure recovery requests based at least in part on detecting the beam failure, wherein the plurality of resources are on a plurality of SCells configured for the UE,
wherein the plurality of SCells, on which the plurality of beam failure recovery requests are to be transmitted, are indicated by a rule indicating that the plurality of SCells are to be identified based at least in part on:
the plurality of SCells being associated with channel measurement conditions that satisfy a condition or threshold, and
wherein the plurality of SCells includes all SCells, configured for the UE, that satisfy the condition or the threshold; and
transmit the beam failure recovery requests to the network entity using the plurality of resources.

24. The UE of claim 23, wherein the plurality of SCells are configured with at least one of a physical uplink control channel resource group for a beam failure recovery request, a contention-free random access resource, or a combination thereof.

25. The UE of claim 23, wherein the plurality of SCells include one or more SCells, configured for the UE, for which a physical uplink control channel resource group for a beam failure recovery request is configured.

26. The method of claim 17, wherein the beam failure recovery response is transmitted to the UE using the PCell.

27. A network entity for wireless communication, comprising:
a memory; and
one or more processors coupled to the memory, the one or more processors configured to cause the network entity to:
communicate with a user equipment (UE) using a primary cell (PCell) and a secondary cell (SCell) for carrier aggregation;
indicate, to the UE, a rule indicating that a plurality of SCells are to be used for transmission of a plurality of beam failure recovery requests based at least in part on:
the plurality of SCells being associated with channel measurement conditions that satisfy a condition or threshold;
receive the beam failure recovery requests from the UE for the plurality of SCells, wherein the beam failure recovery requests are received from all SCells, configured for the UE, that satisfy the condition or the threshold; and
transmit a beam failure recovery response to the UE based at least in part on receiving the beam failure recovery requests.

28. The network entity of claim 27, wherein the one or more processors are further configured to:
receive another beam failure recovery request on the PCell.

29. The network entity of claim 27, wherein the beam failure recovery response is transmitted to the UE using the PCell.

* * * * *